US012634418B2

(12) United States Patent
Shoji

(10) Patent No.: US 12,634,418 B2
(45) Date of Patent: May 19, 2026

(54) CONTROL METHOD FOR PROJECTOR, NON-TRANSITORY COMPUTER-READABLE STORAGE MEDIUM STORING PROGRAM, AND PROJECTOR

(71) Applicant: SEIKO EPSON CORPORATION, Tokyo (JP)

(72) Inventor: Takanori Shoji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 312 days.

(21) Appl. No.: 18/351,537

(22) Filed: Jul. 13, 2023

(65) Prior Publication Data

US 2024/0022697 A1     Jan. 18, 2024

(30) Foreign Application Priority Data

Jul. 13, 2022     (JP) ................................. 2022-112166

(51) Int. Cl.
*H04N 9/31* (2006.01)

(52) U.S. Cl.
CPC ......... *H04N 9/3179* (2013.01); *H04N 9/3147* (2013.01); *H04N 9/317* (2013.01); *H04N 9/3194* (2013.01); *G06T 2207/20092* (2013.01)

(58) Field of Classification Search
CPC .. H04N 9/3179; H04N 9/3194; H04N 9/3147; H04N 9/317
See application file for complete search history.

(56) References Cited

U.S. PATENT DOCUMENTS

| | | | | |
|---|---|---|---|---|
| 10,602,105 B2 * | 3/2020 | Ota | .................... | H04N 9/3197 |
| 2005/0116968 A1 * | 6/2005 | Barrus | ................ | H04N 9/3147 345/698 |
| 2011/0122147 A1 * | 5/2011 | Yasukawa | ........... | H04N 9/3179 345/589 |
| 2019/0238805 A1 * | 8/2019 | Ota | .................... | H04N 9/3197 |

FOREIGN PATENT DOCUMENTS

JP     2019-132939 A     8/2019

OTHER PUBLICATIONS

Panasonic Corporation, "Downlight Projector BioSHADOW", website launch date Jun. 2021, available on Jun. 2, 2022, 5 pages.
Panasonic Corporation, "Examples of Ambiances Created with BioSHADOW and Built-in Content at Various Scenes: Public Transport Facilities, Underground Passages, etc.", YouTube video posted Mar. 3, 2021, 4 pages.

* cited by examiner

*Primary Examiner* — Bao-Luan Q Le
(74) *Attorney, Agent, or Firm* — Dority & Manning, P.A.

(57)     ABSTRACT

A control method for a projector includes: projecting a first image as a projection image onto a projection surface; determining a first in-focus point indicating an in-focus position in the projection image on the projection surface; determining a second in-focus point in the first image corresponding to the first in-focus point; and projecting a second image generated by performing first blurring over a range including the second in-focus point in the first image, as the projection image onto the projection surface.

8 Claims, 11 Drawing Sheets

CONTROL METHOD FOR PROJECTOR, NON-TRANSITORY COMPUTER-READABLE STORAGE MEDIUM STORING PROGRAM, AND PROJECTOR

The present application is based on, and claims priority from JP Application Serial Number 2022-112166, filed Jul. 13, 2022, the disclosure of which is hereby incorporated by reference herein in its entirety.

BACKGROUND

1. Technical Field

The present disclosure relates to a control method for a projector, a non-transitory computer-readable storage medium storing a program, and a projector.

2. Related Art

JP-A-2019-132939 describes a technique of controlling the projection of a content image in such a way that a position to be in focus on a projection surface is in focus, using position specification information specifying the position to be in focus on the projection surface.

The technique described in JP-A-2019-132939 can focus on the position to be in focus on the projection surface. However, for example, when the distance from the projector to the projection surface varies greatly from one area to another on the projection surface, a sense of incongruity may be generated due to the difference in the way the image looks between an area in focus and an area out of focus in the image projected on the projection surface.

SUMMARY

According to an aspect of the present disclosure, a control method for a projector includes: projecting a first image as a projection image onto a projection surface; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface.

According to another aspect of the present disclosure, a non-transitory computer-readable storage medium storing a program is provided. The program causes a computer to execute: projecting a first image as a projection image onto a projection surface; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface.

According to still another aspect of the present disclosure, a projector includes an optical device and at least one processor. The at least one processor executes: projecting a first image as a projection image onto a projection surface, using the optical device; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface, using the optical device.

BRIEF DESCRIPTION OF THE DRAWINGS

FIG. 3 shows an example of the configuration of the projector according to the embodiment.

DESCRIPTION OF EXEMPLARY EMBODIMENTS

An embodiment will now be described with reference to the drawings.

1. Configuration of Projection System

Figure 1:
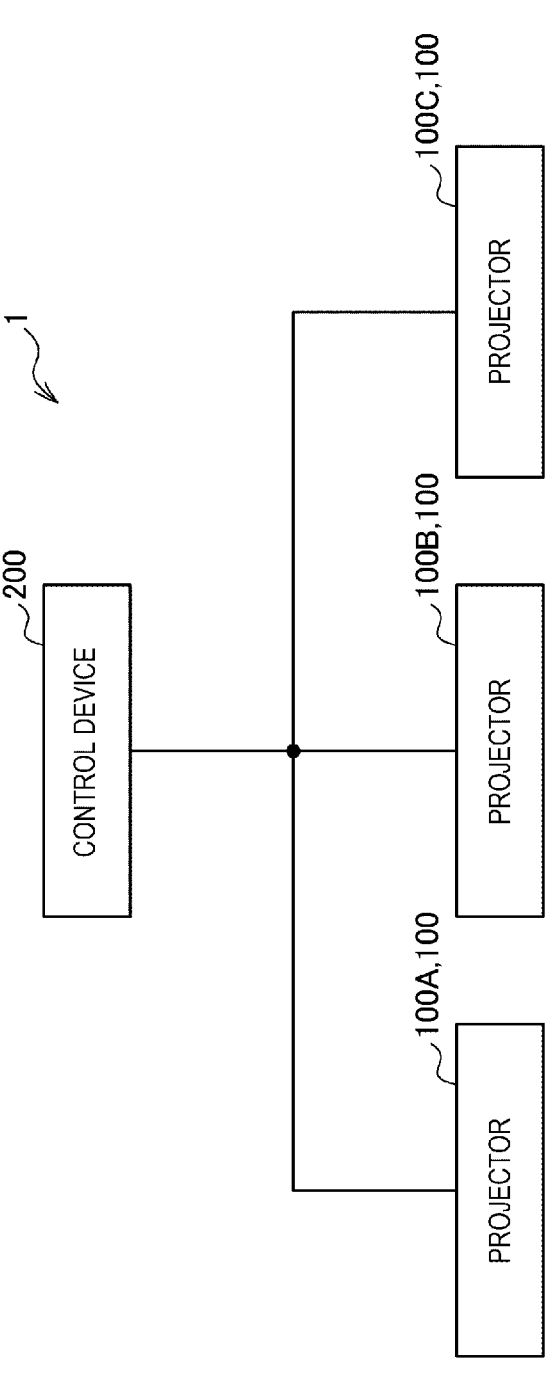
FIG. 1 shows an example of the configuration of a projection system.

First, the configuration of a projection system 1 will be described with reference to FIG. 1. FIG. 1 shows an example of the configuration of the projection system 1. As shown in FIG. 1, the projection system 1 includes a plurality of projectors 100 and a control device 200. In this embodiment, the plurality of projectors 100 are made up of, for example, a projector 100A, a projector 100B, and a projector 100C.

The projector 100A, the projector 100B, and the projector 100C have substantially the same configuration. Therefore, in the description below, each of the projector 100A, the projector 100B, and the projector 100C may be referred to as the projector 100 when the projector 100A, the projector 100B, and the projector 100C need not be distinguished from each other.

The projector 100 is communicatively coupled to the control device 200 via a network NW. For example, the projector 100 is communicatively coupled to the control device 200 in conformity with the Ethernet (trademark registered) standard. The network NW is, for example, a LAN (local area network). The projector 100 projects a projection image PB received from the control device 200 onto a projection surface SC. The projection surface SC is, for example, a wall surface WL.

The wall surface WL will be described further with reference to FIG. 2.

In this embodiment, a case where the projection system 1 includes three projectors 100 is described. However, this is not limiting. The projection system 1 may include at least one projector 100. For example, the projection system 1 may be made up of one or two projectors 100 and the control device 200. Also, for example, the projection system 1 may include four or more projectors 100.

In this embodiment, a case where the network NW is a LAN is described. However, this is not limiting. The network NW may be, for example, a WAN (wide area network). The network NW may also be, for example, the internet.

The control device 200 is formed of, for example, a personal computer. The control device 200 stores a first image P1 and outputs the first image P1 as the projection image PB to each of the projector 100A, the projector 100B, and the projector 100C.

The first image P1 will be described further with reference to FIG. 4.

In this embodiment, a case where the control device 200 is formed of a personal computer is described. However, this is not limiting. The control device 200 may be formed of, for example, a smartphone, a tablet terminal or the like.

The control device 200 may also be formed as a server device. In other words, the projection system 1 may include a server device instead of the control device 200, and the server device may be communicatively coupled to each of the three projectors 100 via the internet.

2. Arrangement and Configuration of Projector

The arrangement of the projector 100 will now be described with reference to FIG. 2. FIG. 2 is a cross-sectional view showing an example of the arrangement of the projector 100 according to this embodiment.

Figure 2:
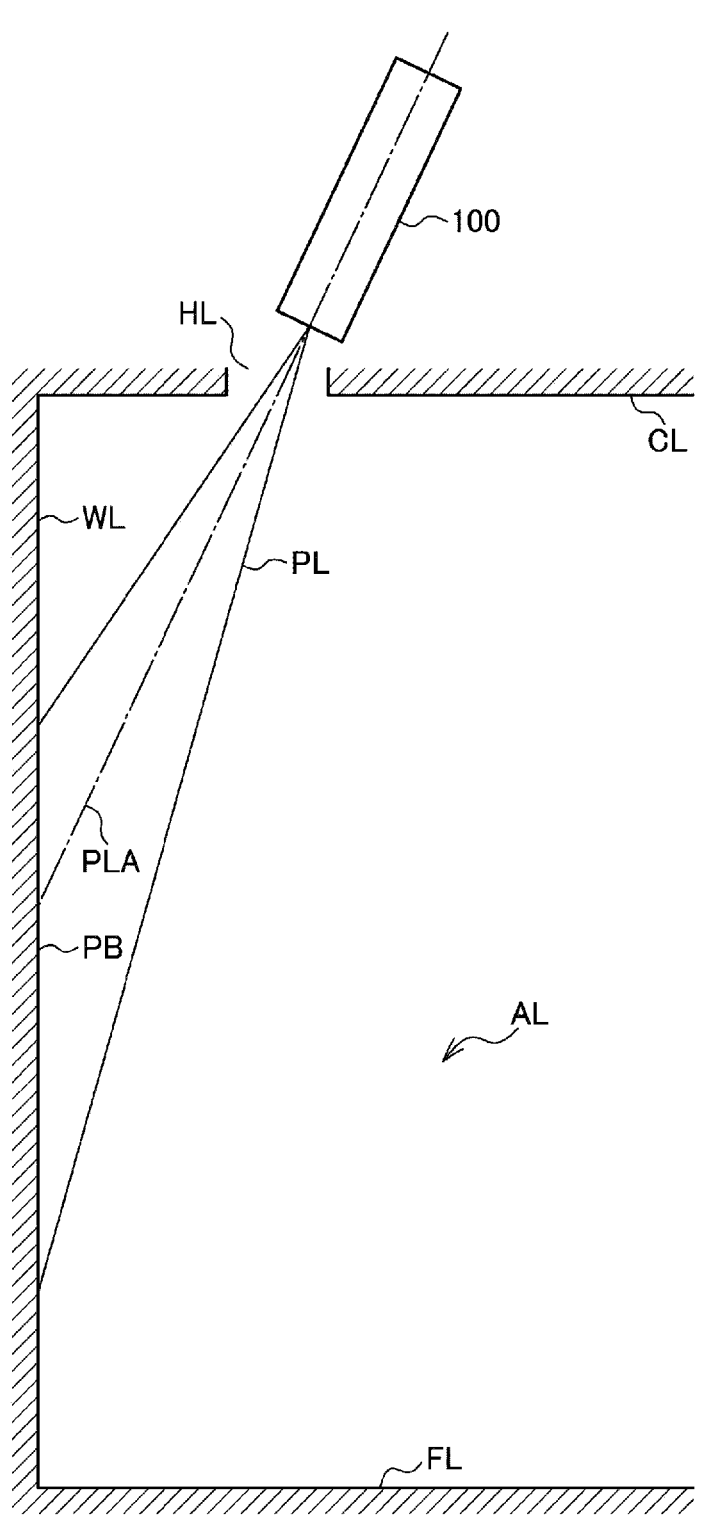
FIG. 2 is a cross-sectional view showing an example of the arrangement of a projector according to an embodiment.

As shown in FIG. 2, the projector 100 is arranged, for example, above a ceiling CL of an aisle AL. The wall surface WL is provided at a lateral side of the aisle AL. A floor surface FL is provided at the bottom of the aisle AL. The aisle AL extends in a direction of depth in FIG. 2, that is, in a direction orthogonal to the sheet surface. The projector 100 projects image light PL onto the wall surface WL, for example, through a hole HL formed in the ceiling CL.

The projector 100A, the projector 100B, and the projector 100C are arrayed along the aisle AL. An axis of projection PLA represents an optical axis passing through the center of the image light PL. The projector 100 is arranged in such a way that the axis of projection PLA is inclined in relation to the wall surface WL. The image light PL from the projector 100 is used, for example, as indirect lighting in the aisle AL.

The projection image PB is displayed on the wall surface WL from the projector 100. Therefore, displaying a beautiful landscape or the like as the projection image PB can allow a pedestrian walking through the aisle AL to enjoy the projection image PB. Also, the aesthetic appearance of the aisle AL can be improved.

As shown in FIG. 2, the projector 100 projects the projection image PB onto the wall surface WL, which is an example of the projection surface SC. For example, the projector 100 projects the image light PL toward the wall surface WL and thus displays the projection image PB on the wall surface WL.

The projection image PB will be described further with reference to FIG. 3.

In this embodiment, a case where the projector 100 displays the projection image PB, for example, on the wall surface WL, is described. However, the projector 100 may display the projection image PB, for example, on the floor surface FL.

The configuration of the projector 100 will now be described with reference to FIG. 3. FIG. 3 shows an example of the configuration of the projector 100 according to this embodiment.

Figure 3:
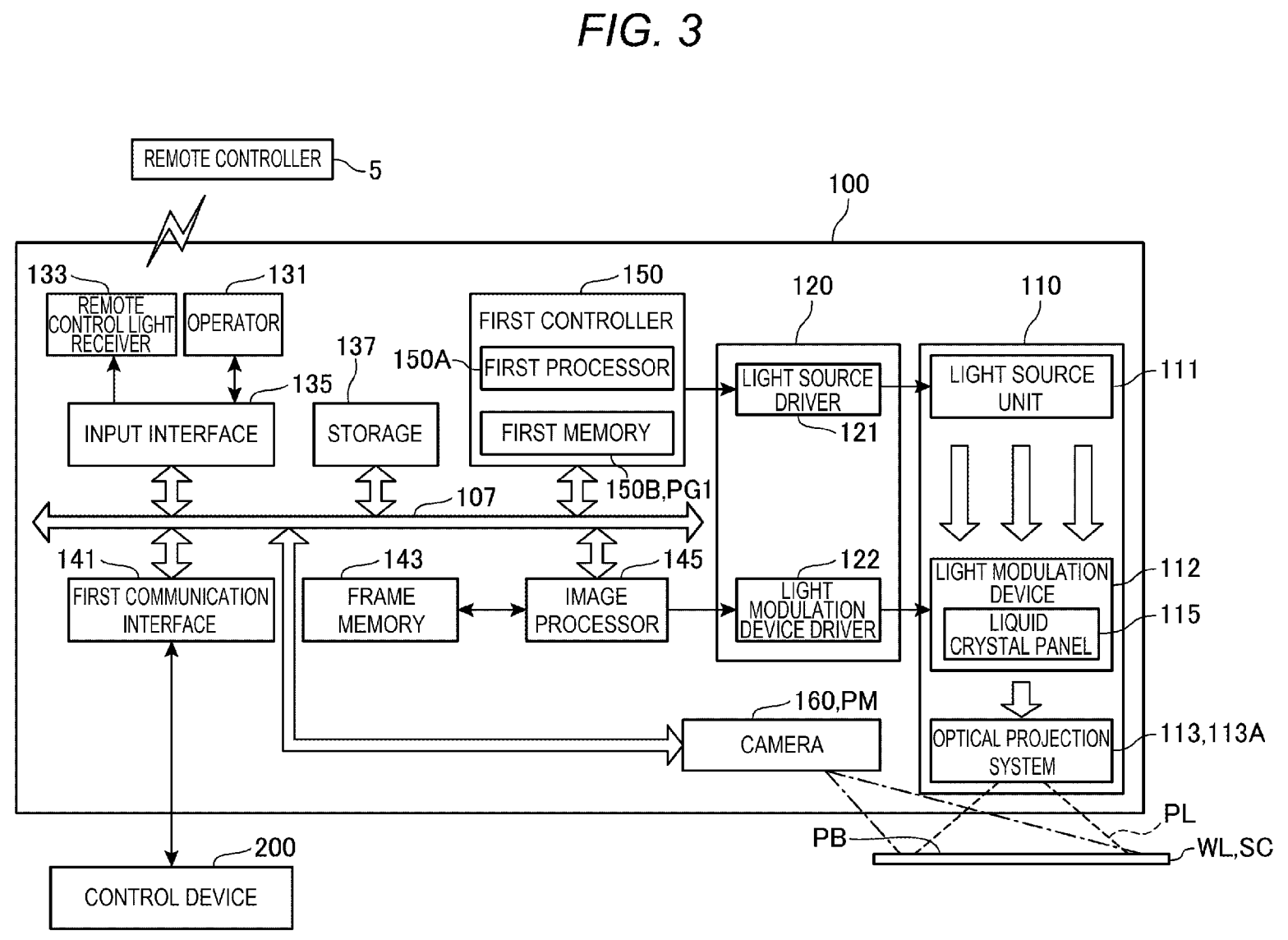

As shown in FIG. 3, the projector 100 has a projection unit 110 and a driver 120 driving the projection unit 110. The projection unit 110 generates an optical image and projects the image onto the projection surface SC.

The projection unit 110 has a light source unit 111, a light modulation device 112, and an optical projection system 113. The driver 120 has a light source driver 121 and a light modulation device driver 122.

The projection unit 110 corresponds to an example of an "optical device".

The light source unit 111 has a lamp such as a halogen lamp, a xenon lamp or an ultra-high-pressure mercury lamp, or a solid-state light source such as an LED (light-emitting diode) or a laser light source.

The light source unit 111 may also have a reflector and an auxiliary reflector that guide light emitted from the light source to the light modulation device 112. The light source unit 111 may also have a lens set for enhancing optical characteristics of projection light, a polarizer, or a dimmer or the like that reduces the amount of light of the light emitted from the light source, on the path to the light modulation device 112.

The light source driver 121 is coupled to an internal bus 107 and turns on and off the light source of the light source unit 111 in response to an instruction from a first controller 150 similarly coupled to the internal bus 107.

The light modulation device 112 has, for example, three liquid crystal panels 115 corresponding to the three primary colors of R, G, and B. R represents the color red. G represents the color green. B represents the color blue. That is, the light modulation device 112 has a liquid crystal panel 115 corresponding to R-color light, a liquid crystal panel 115 corresponding to G-color light, and a liquid crystal panel 115 corresponding to a B-color light.

The light emitted from the light source unit 111 is separated into color lights of the three colors of RGB, which then enter the corresponding liquid crystal panels 115, respectively. Each of the three liquid crystal panels 115 is a transmission-type liquid crystal panel, and modulates the light transmitted therethrough and thus generates image light PL. The image lights PL passed through and thus modulated by the liquid crystal panels 115 are combined together by an optical combining system such as a cross dichroic prism and emitted to the optical projection system 113.

The light modulation device 112 is driven by the light modulation device driver 122. The light modulation device driver 122 is coupled to an image processor 145.

Image data corresponding to the primary colors of R, G, and B are inputted to the light modulation device driver 122 from the image processor 145. The light modulation device driver 122 converts the inputted image data into a data signal suitable for the operation of the liquid crystal panels 115. Based on the converted data signal, the light modulation device driver 122 applies a voltage to each pixel in each liquid crystal panel 115 and draws an image corresponding to the projection image PB in each liquid crystal panel 115. The light modulation device 112 may have a reflection-type liquid crystal panel, an LCOS (liquid crystal on silicon) liquid crystal panel, or a light modulation panel other than a liquid crystal panel, for example, a DMD (digital micro-mirror device), instead of the liquid crystal panel 115.

The optical projection system 113 has a lens and a mirror or the like causing the image light PL incident thereon to generate an image on the projection surface SC. The optical projection system 113 may also have a zoom mechanism for enlarging or reducing the image projected on the projection surface SC, a focus adjustment mechanism for adjusting the focus, or the like.

In this embodiment, a case where the optical projection system 113 has a projection lens 113A causing the image light PL incident thereon to generate an image on the projection surface SC is described.

The projection lens 113A and a focal length FD will be described further with reference to FIG. 7. The focal length FD is the focal length of the projection lens 113A.

The projector 100 also has an operator 131, a remote control light receiver 133, an input interface 135, a storage 137, a first communication interface 141, a frame memory 143, the image processor 145, the first controller 150, and a camera 160. The input interface 135, the storage 137, the first communication interface 141, the image processor 145, the first controller 150, and the camera 160 are coupled in such a way as to be able to communicate data to each other via the internal bus 107.

The operator 131 has various buttons and switches provided at a surface of the casing of the projector 100, generates an operation signal corresponding to an operation on these buttons and switches, and outputs the operation signal to the input interface 135. The input interface 135 outputs the operation signal inputted from the operator 131, to the first controller 150.

The remote control light receiver 133 receives an infrared signal transmitted from a remote controller 5, decodes the received infrared signal, and thus generates an operation signal. The remote control light receiver 133 outputs the generated operation signal to the input interface 135. The input interface 135 outputs the operation signal inputted from the remote control light receiver 133, to the first controller 150.

The storage 137 is, for example, a non-volatile storage device such as an HDD (hard disk drive) or an SSD (solid-state drive). The storage 137 stores a program to be executed by the first controller 150, data processed by the first controller 150, and image data or the like.

The first communication interface 141 has a connector and an interface circuit and is communicatively coupled to the control device 200. In this embodiment, the first communication interface 141 is, for example, an interface for communicating with the control device 200 in conformity with the Ethernet (trademark registered) standard. The first communication interface 141 receives the first image P1 as the projection image PB from the control device 200.

The camera 160 picks up an image of the projection image PB displayed on the wall surface WL and generates a captured image PM, in response to an instruction from the first controller 150. For example, when the projection unit 110 projects a pattern image PP as the projection image PB on the wall surface WL, the camera 160 picks up an image of the projection image PB and generates the captured image PM. The camera 160 also outputs the captured image PM to the first controller 150.

The pattern image PP and the captured image PM will be described further with reference to FIG. 4.

The first controller 150 has a first processor 150A and a first memory 150B.

The first memory 150B is a storage device storing a program to be executed by the first processor 150A and data in a non-volatile manner. The first memory 150B is formed of a semiconductor storage element such as a magnetic storage device or a flash ROM (read-only memory), or another type of non-volatile storage device. The first memory 150B may also include a RAM (random-access memory) forming a work area of the first processor 150A. The first memory 150B may also include a non-volatile storage device such as an HDD or an SSD.

The first memory 150B stores data processed by the first controller 150 and a first control program PG1 to be executed by the first processor 150A.

The first processor 150A may be formed of a single processor or may be configured in such a way that a plurality of processors function as the first processor 150A. The first processor 150A executes the first control program PG1 and thus controls each part of the projector 100. For example, the first processor 150A outputs an instruction to execute image processing corresponding to an operation received by the operator 131 or the remote controller 5, and a parameter used for this image processing, to the image processor 145. The parameter includes, for example, a geometric correction parameter for correcting a geometric distortion of the projection image PB projected on the projection surface SC, or the like. The first processor 150A also controls the light source driver 121 and thus controls the turning on and off of the light source unit 111.

Each of the image processor 145 and the first controller 150 can be formed of, for example, an integrated circuit. The integrated circuit includes an LSI, an ASIC (application-specific integrated circuit), and a PLD (programmable logic device). The PLD includes, for example, an FPGA (field-programmable gate array). A part of the configuration of the integrated circuit may include an analog circuit. A combination of a processor and an integrated circuit may be employed. The combination of a processor and an integrated circuit is referred to as a microcontroller (MCU), a SoC (system-on-a-chip), a system LSI, a chip set or the like.

The image processor 145 loads the image data stored in the first memory 150B or the storage 137 into the frame memory 143. The frame memory 143 has a plurality of banks. Each bank has a storage capacity in which image data for one frame can be written. The frame memory 143 is formed of, for example, an SDRAM (synchronous dynamic random-access memory).

The image processor 145 performs, for example, image processing such as resolution conversion or resizing, correction of a distortion, shape correction, digital zoom or adjustment of the color tone or the luminance of the image on the image data loaded in the frame memory 143, in response to an instruction from the first controller 150.

The first processor 150A of the first controller 150 executes the first control program PG1 and thus executes, for example, the processing described below.

The first processor 150A causes the first communication interface 141 to receive the projection image PB from the control device 200. The first processor 150A then causes the liquid crystal panel 115 to display the projection image PB, via the light modulation device driver 122. The first processor 150A also causes the projection unit 110 to project the image light PL representing the projection image PB onto the wall surface WL, via the driver 120.

In this way, the projector 100 displays the projection image PB on the wall surface WL.

3. Configuration of Control Device

The configuration of the control device 200 will now be described with reference to FIG. 4. FIG. 4 shows an example of the configuration of the control device 200 according to this embodiment.

The control device 200 is formed of, for example, a personal computer. As shown in FIG. 4, the control device 200 has a second controller 210, an operation mechanism 220, a display mechanism 230, and a second communication interface 240.

The second controller 210 has a second processor 210A and a second memory 210B.

The second memory 210B is a storage device storing a program to be executed by the second processor 210A and data in a non-volatile manner. The second memory 210B is formed of a semiconductor storage element such as a magnetic storage device or a flash ROM, or another type of non-volatile storage device. The second memory 210B may also include a RAM forming a work area of the second processor 210A. The second memory 210B may also include a non-volatile storage device such as an HDD or an SSD.

The second memory 210B stores data processed by the second controller 210 and a second control program PG2 to be executed by the second processor 210A.

The second processor 210A may be formed of a single processor or may be configured in such a way that a plurality of processors function as the second processor 210A. The second processor 210A executes the second control program PG2 and thus controls each part of the control device 200.

The operation mechanism 220 receives an operation from a user, generates an operation signal corresponding to the operation, and transmits the operation signal to the second controller 210. The operation mechanism 220 is formed of, for example, a keyboard, a mouse or the like.

The display mechanism 230 has an LCD (liquid crystal display) or the like and displays various images on the LCD in response to an instruction from the second controller 210.

The second communication interface 240 has a connector and an interface circuit and is communicatively coupled to the projector 100. In this embodiment, the second communication interface 240 is, for example, an interface for communicating with the projector 100 in conformity with the Ethernet (trademark registered) standard. The second communication interface 240 transmits the projection image PB to the projector 100 in response to an instruction from the second controller 210.

Figure 4:
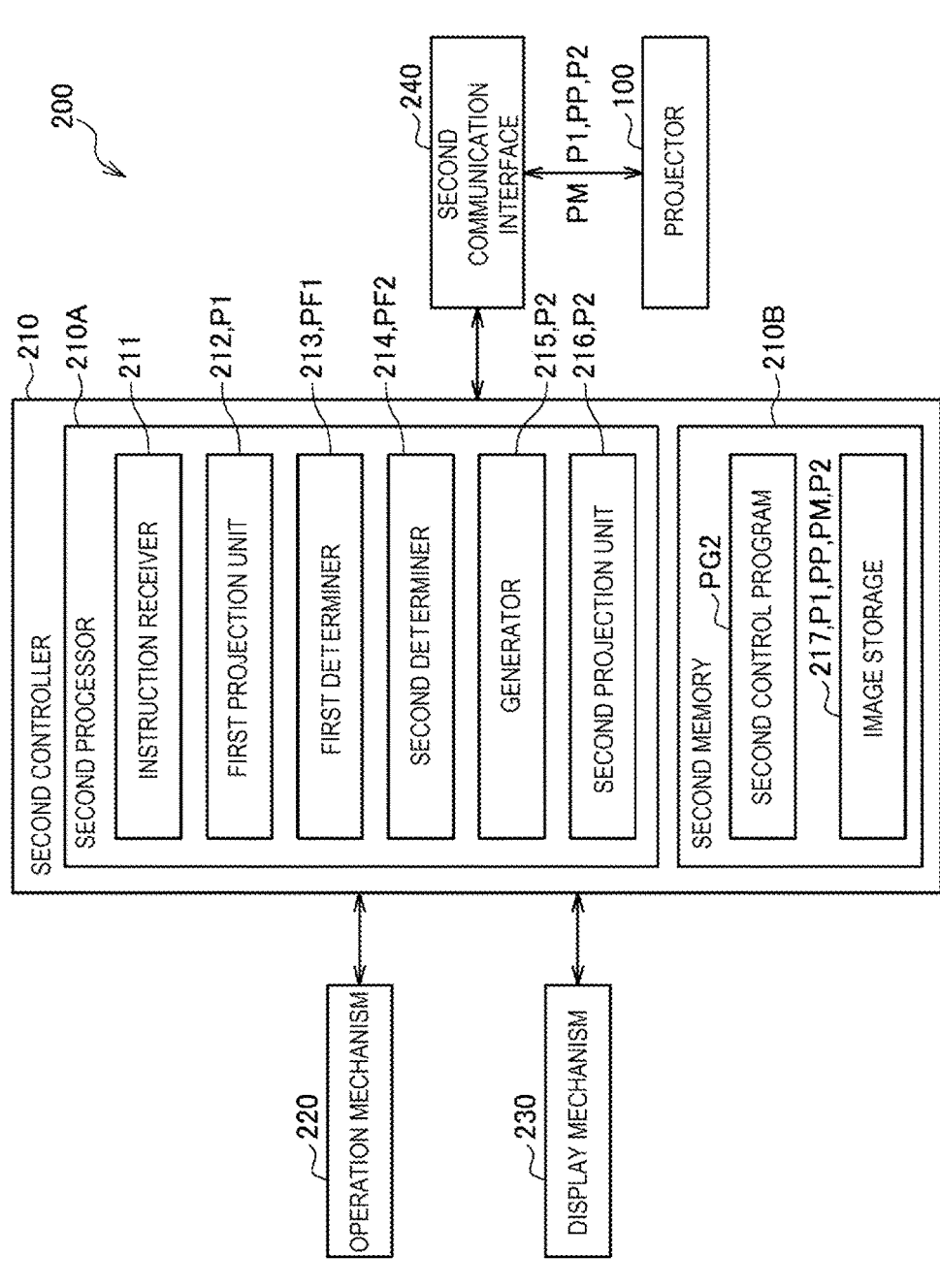
FIG. 4 shows an example of the configuration of a control device according to the embodiment.

As shown in FIG. 4, the second controller 210 has an instruction receiver 211, a first projection unit 212, a first determiner 213, a second determiner 214, a generator 215, a second projection unit 216, and an image storage 217.

Specifically, the second processor 210A of the second controller 210 executes the second control program PG2 stored in the second memory 210B and thus functions as the instruction receiver 211, the first projection unit 212, the first determiner 213, the second determiner 214, the generator 215, and the second projection unit 216. Also, the second processor 210A of the second controller 210 executes the second control program PG2 stored in the second memory 210B and thus causes the second memory 210B to function as the image storage 217.

The second control program PG2 corresponds to an example of a "program".

The second processor 210A corresponds to an example of a "computer".

The image storage 217 stores the first image P1 and the pattern image PP in advance. The image storage 217 also stores the captured image PM generated by the camera 160 arranged in the projector 100. The image storage 217 also stores a second image P2 generated by the generator 215.

The instruction receiver 211 receives an instruction from the user, based on an operation to the operation mechanism

220 from the user. The instruction receiver 211 receives, for example, an operation of designating an in-focus position in a first projection image PB1.

The first projection image PB1 corresponds to an example of the projection image PB.

The first projection unit 212 projects the first image P1 as the first projection image PB1 onto the projection surface SC.

Specifically, the first projection unit 212 reads out the first image P1 from the image storage 217 and transmits the first image P1 as the first projection image PB1 to the projector 100. The first projection unit 212 then causes the projector 100 to project the first image P1 as the first projection image PB1 onto the projection surface SC. The first projection image PB1 corresponds to an example of the projection image PB.

The first image P1 will be described further with reference to FIG. 5.

The first determiner 213 determines a first in-focus point PF1 indicating an in-focus position in the first projection image PB1 on the projection surface SC. The first determiner 213 determines the first in-focus point PF1, for example, by one of a first method, a second method, and a third method. Each of the first method, the second method, and the third method will now be described.

First, the first method is described.

The first determiner 213 receives an operation of designating an in-focus position in the first projection image PB1 from the user and determines the position designated by the operation, as a first in-focus point PF11.

The operation of designating an in-focus position in the first projection image PB1 is, for example, pointing at an in-focus position with a forefinger or the like, in the first projection image PB1 projected on the projection surface SC. The first determiner 213 causes the camera 160 arranged in the projector 100 to capture the captured image PM including the first projection image PB1 and the forefinger of the hand of the user. The first determiner 213 then acquires the captured image PM from the projector 100 and determines the first in-focus point PF11, based on the position in the image of the forefinger of the user included in the captured image PM.

The first in-focus point PF11 corresponds to an example of the first in-focus point PF1.

The operation of designating a in-focus position in the first projection image PB1 may be, for example, an operation of causing the display mechanism 230 to display the first projection image PB1 and allowing the user to input an in-focus position in the first projection image PB1 to the first projection image PB1 displayed on the LCD, via the operation mechanism 220.

The first method will be described further with reference to FIG. 6.

The second method will now be described.

The first determiner 213 acquires, for example, a distance LS between the projector 100 and the projection surface SC, an angle θ formed by the axis of projection PLA of the projector 100 and the projection surface SC, and the focal length FD of the projection lens 113A provided in the projector 100. The first determiner 213 then determines a first in-focus point PF12, based on the distance LS, the angle θ, and the focal length FD.

The second method will be described further with reference to FIG. 7.

The third method will now be described.

The first determiner 213 projects the pattern image PP as the projection image PB onto the projection surface SC. The first determiner 213 then picks up an image of the projection image PB on the projection surface SC and thus generates the captured image PM. Specifically, the first determiner 213 causes the camera 160 of the projector 100 to capture an image of the projection image PB on the projection surface SC and thus generate the captured image PM. The first determiner 213 then acquires the captured image PM from the camera 160. Next, the first determiner 213 determines a third in-focus point PF3 indicating the in-focus position in the captured image PM. The first determiner 213 then determines a position in the first projection image PB1 corresponding to the third in-focus point PF3, as the first in-focus point PF1.

The pattern image PP is, for example, an image in which grid lines are formed in an entire image area. Also, the pattern image PP is, for example, an image in which a checkered pattern is formed in the entire image area. Projecting the pattern image PP as the projection image PB enables the third in-focus point PF3 to be determined appropriately.

The third method will be described further with reference to FIG. 6.

In this embodiment, a case where when the projection unit 110 projects the first image P1 instead of the pattern image PP as the first projection image PB1 onto the wall surface WL, the camera 160 picks up an image of the first projection image PB1 and generates the captured image PM, is described. The first determiner 213 determines the third in-focus point PF3 indicating the in-focus position in the captured image PM. The first determiner 213 determines a position in the first projection image PB1 corresponding to the third in-focus point PF3, as the first in-focus point PF1.

The second determiner 214 determines a second in-focus point PF2 corresponding to the first in-focus point PF1, in the first image P1.

The second determiner 214 calculates, for example, the coordinates of the first in-focus point PF1 in the first projection image PB1. For example, the second determiner 214 sets an S-coordinate in an up-down direction of the first projection image PB1 and sets a T-coordinate in a left-right direction of the first projection image PB1. The second determiner 214 then calculates, for example, the coordinates (S1, T1) of the first in-focus point PF1 in the first projection image PB1. Also, for example, the second determiner 214 sets a U-coordinate in an up-down direction of the first image P1 and sets a V-coordinate in a left-right direction of the first image P1. The second determiner 214 then calculates the coordinates (U1, V1) corresponding to the coordinates (S1, T1) of the first in-focus point PF1 and determines a position in the first image P1 corresponding to the calculated coordinates (U1, V1), as the second in-focus point PF2.

The second in-focus point PF2 will be described further with reference to FIG. 8.

The generator 215 performs blurring over a range including the second in-focus point PF2 in the first image P1 and thus generates the second image P2.

The generator 215 performs, for example, a first level of blurring, which is the highest level, on the second in-focus point PF2 in the first image P1. The first image P1 includes a first reference point PS1, which is at a first distance L1 from the second in-focus point PF2, and a second reference point PS2, which is at a second distance L2 longer than the first distance L1, from the second in-focus point PF2. The generator 215 performs, for example, a second level of blurring on the first reference point PS1, which is a higher level than a third level of blurring on the second reference point PS2.

The blurring is, for example, averaging. In other words, the blurring is executed by applying an averaging filter to a target image area. Also, for example, increasing the size of the averaging filter used for the blurring can make the blurring stronger. In other words, the stronger blurring refers to executing averaging with an increased filter size.

The first level of blurring corresponds to an example of "first blurring". The second level of blurring corresponds to an example of "second blurring". The third level of blurring corresponds to an example of "third blurring".

The first reference point PS1 and the second reference point PS2 will be described further with reference to FIG. 8.

The second image P2 will be described further with reference to FIG. 9.

The second projection unit 216 projects the second image P2 as a second projection image PB2 onto the projection surface SC.

Specifically, the second projection unit 216 acquires, for example, the second image P2 generated by the generator 215 and transmits the second image P2 as the second projection image PB2 to the projector 100. The second projection unit 216 then causes the projector 100 to project the second image P2 as the second projection image PB2 onto the projection surface SC. The second projection image PB2 corresponds to an example of the projection image PB.

The second projection image PB2 will be described further with reference to FIG. 10.

In this embodiment, a case where the second controller 210 of the control device 200 has the instruction receiver 211, the first projection unit 212, the first determiner 213, the second determiner 214, the generator 215, the second projection unit 216, and the image storage 217 is described. However, this is not limiting. For example, the first controller 150 of the projector 100, that is, each of the projector 100A, the projector 100B, and the projector 100C, may have the instruction receiver 211, the first projection unit 212, the first determiner 213, the second determiner 214, the generator 215, the second projection unit 216, and the image storage 217. In this case, the projection system 1 need not have the control device 200.

4. Specific Example of First Image, First Projection Image, and Captured Image

An example of the first image P1 will now be described with reference to FIG. 5. FIG. 5 is an image showing an example of the first image P1.

Figure 5:
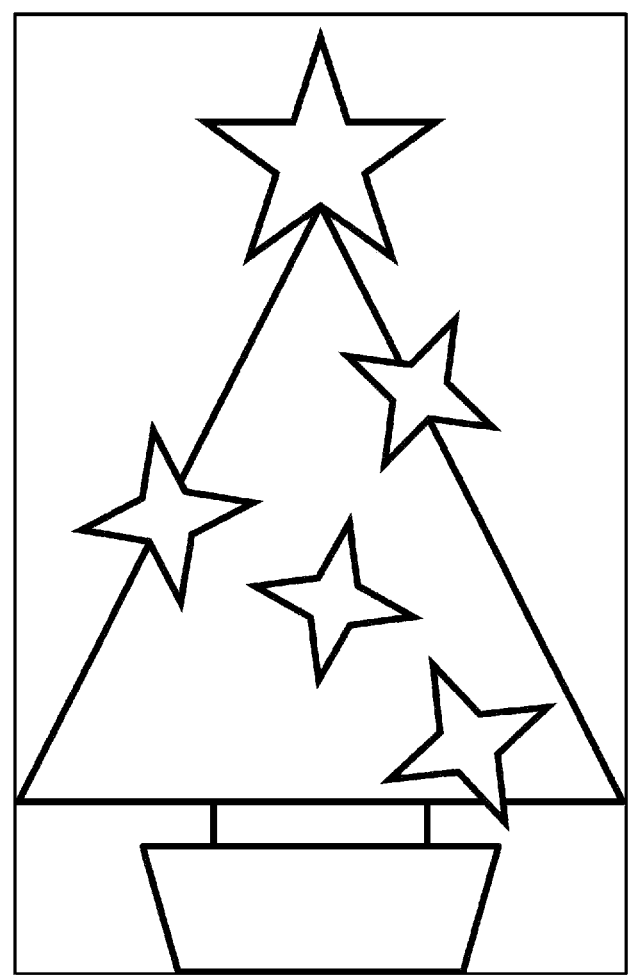
FIG. 5 is an image showing an example of a first image.

As shown in FIG. 5, the first image P1 is, for example, an illustration based on a line drawing of a Christmas tree. The first image P1 is generated, for example, by a clear solid line.

An example of the first projection image PB1 and the captured image PM will now be described with reference to FIG. 6. FIG. 6 is an image showing an example of the first projection image PB1 and the captured image PM. In this embodiment, for the sake of convenience, a case where the camera 160 of the projector 100 focuses on all the areas of the first projection image PB1 is described. In other words, a case where the captured image PM is the same image as the first projection image PB1 is described.

Each of the first projection image PB1 and the captured image PM is generated of an in-focus area AF, a first non-in-focus area AN1, and a second non-in-focus area AN2. The in-focus area AF, the first non-in-focus area AN1, and the second non-in-focus area AN2 are determined by the generator 215.

The in-focus area AF is arranged at the center of each of the first projection image PB1 and the captured image PM.

In the in-focus area AF, each of the first projection image PB1 and the captured image PM is in focus. That is, in the in-focus area AF, each of the first projection image PB1 and the captured image PM is generated by a clear solid line similarly to the first image P1.

The first non-in-focus area AN1 is arranged adjacently above the in-focus area AF and adjacently below the in-focus area AF in each of the first projection image PB1 and the captured image PM. In the first non-in-focus area AN1, each of the first projection image PB1 and the captured image PM is not in focus. That is, in the first non-in-focus area AN1, each of the first projection image PB1 and the captured image PM is generated by a blurred solid line. In FIGS. 6 and 9, the "blurred solid line" is shown as a bold dashed line.

The second non-in-focus area AN2 is arranged above the first non-in-focus area AN1 arranged above the in-focus area AF, and below the first non-in-focus area AN1 arranged below the in-focus area AF, in each of the first projection image PB1 and the captured image PM. In the second non-in-focus area AN2, each of the first projection image PB1 and the captured image PM is not in focus to a higher degree of being not in focus than in the first non-in-focus area AN1. That is, in the second non-in-focus area AN2, each of the first projection image PB1 and the captured image PM is generated by a more blurred solid line than in the first non-in-focus area AN1. In FIGS. 6 and 9, the "more blurred solid line" is shown as a thin dashed line.

The first in-focus point PF11 is included in the in-focus area AF. The first in-focus point PF11 indicates the in-focus position in the first projection image PB1 on the projection surface SC. The first in-focus point PF11 is determined by the first determiner 213, using the first method described with reference to FIG. 4. The first in-focus point PF11 corresponds to an example of the first in-focus point PF1.

The third in-focus point PF3 is included in the in-focus area AF and coincides with the first in-focus point PF11. The third in-focus point PF3 indicates the in-focus position in the captured image PM. The third in-focus point PF3 is determined by the first determiner 213, using the third method described with reference to FIG. 4. The first determiner 213 determines a position in the first projection image PB1 corresponding to the third in-focus point PF3, as the first in-focus point PF1.

5. Method for Calculating First In-Focus Point

A method for determining the first in-focus point PF1 in this embodiment will now be described with reference to FIG. 7. In this embodiment, the first determiner 213 determines the first in-focus point PF1, using the second method described with reference to FIG. 4. FIG. 7 is a cross-sectional view showing an example of a method for determining the first in-focus point PF12. The first in-focus point PF12 is determined by the first determiner 213, using the second method described with reference to FIG. 4. The first in-focus point PF12 corresponds to an example of the first in-focus point PF1. Of the parts shown in FIG. 7, the contents described with reference to FIG. 2 will not be described further.

The first determiner 213 determines the first in-focus point PF12, based on the distance LS, the angle θ, and the focal length FD. As shown in FIG. 7, the distance LS is the distance between the projector 100 and the projection surface SC. The angle θ is the angle formed by the axis of projection PLA of the projector 100 and the projection surface SC. The focal length FD is the focal length of the projection lens 113A provided in the projector 100.

The first in-focus point PF12 is found as the point of intersection of an arc AR and the wall surface WL by the first determiner 213. The arc AR is an arc of a circle whose center is at the center position of the projection lens 113A and whose radius is the focal length FD.

Figure 7:
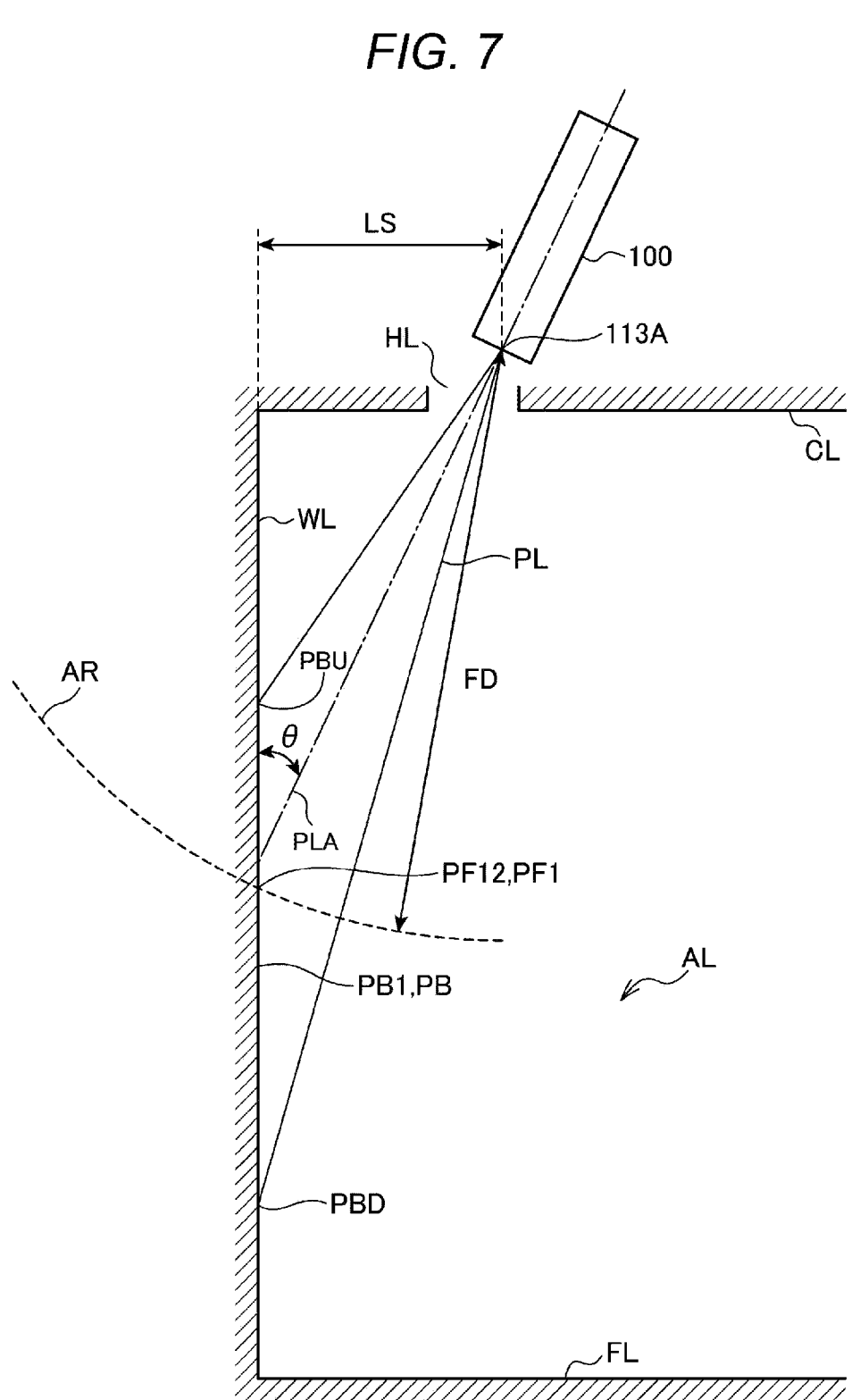
FIG. 7 is a cross-sectional view showing an example of a method for determining a first in-focus point.

An upper end position PBU shown in FIG. 7 indicates the position of an upper end of the first projection image PB1. A lower end position PBD shown in FIG. 7 indicates the position of a lower end of the first projection image PB1. The first projection image PB1 is projected in a range from the upper end position PBU to the lower end position PBD on the wall surface WL.

As described with reference to FIG. 7, the first determiner 213 determines the first in-focus point PF12, based on the distance LS, the angle θ, and the focal length FD. Therefore, the first determiner 213 can calculate the first in-focus point PF12 easily and accurately.

In this embodiment, a case where the first determiner 213 determines the first in-focus point PF12, based on the distance LS, the angle θ, and the focal length FD is described. However, the first determiner 213 may calculate the in-focus area AF shown in FIG. 6. The first determiner 213 calculates the in-focus area AF, for example, based on the distance LS, the angle θ, the focal length FD, and a focal depth. The focal depth corresponds to an area of the focal length FD where the first in-focus point PF1 is in focus.

6. Specific Example of Second Image and Second Projection Image

An example of the second image P2 will now be described with reference to FIGS. 8 and 9. FIG. 8 is an image showing an example of the second in-focus point PF2, the first reference point PS1, and the second reference point PS2 in the first image P1.

Figure 8:
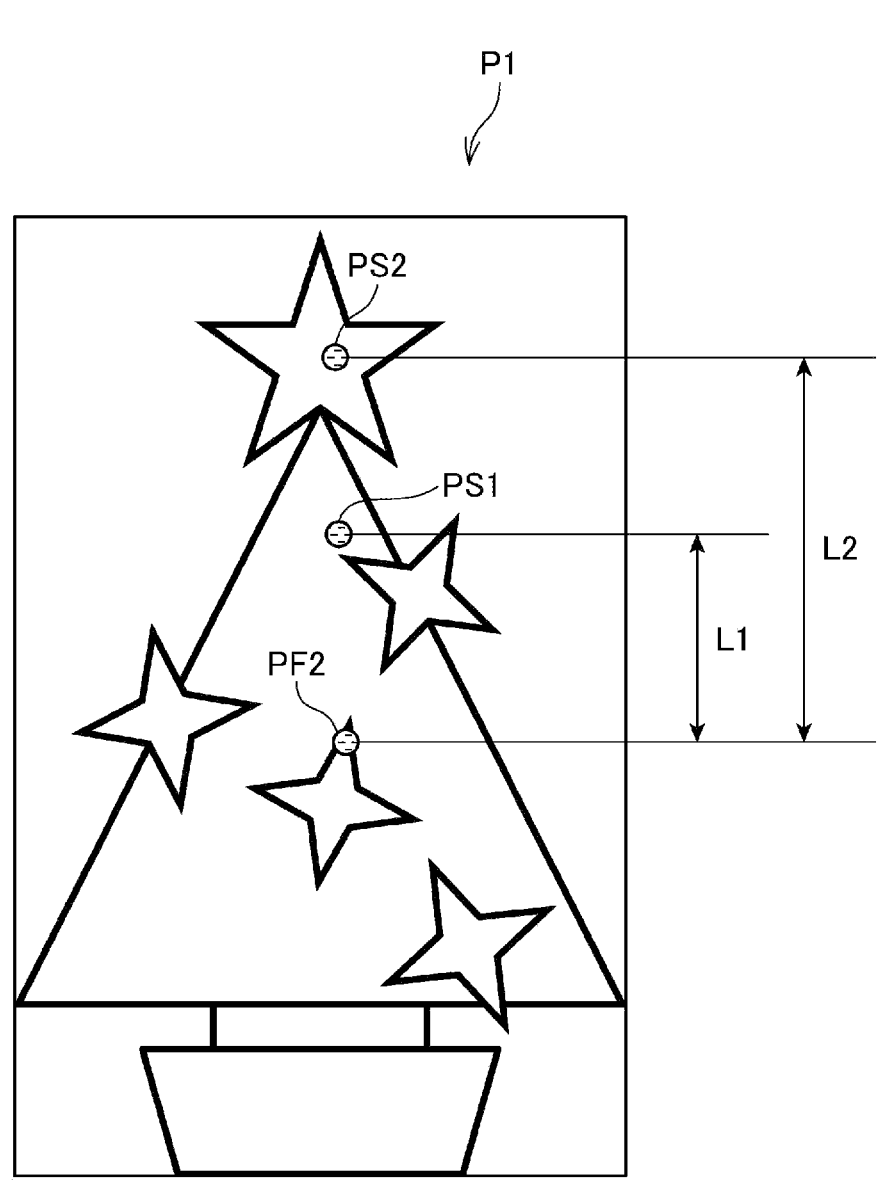
FIG. 8 is an image showing an example of a second in-focus point, a first reference point, and a second reference point.

As shown in FIG. 8, the second in-focus point PF2, the first reference point PS1, and the second reference point PS2 are arranged on the first image P1. The second in-focus point PF2 is determined by the second determiner 214. The second in-focus point PF2 indicates a position corresponding to the first in-focus point PF1, in the first image P1.

FIG. 8 also shows an example of the first reference point PS1 and the second reference point PS2. The first reference point PS1 is a point at the first distance L1 from the second in-focus point PF2 in the first image P1. The second reference point PS2 is a point at the second distance L2 longer than the first distance L1 from the second in-focus point PF2 in the first image P1.

FIG. 8 shows a case where the first reference point PS1 and the second reference point PS2 are arranged above the second in-focus point PF2 in the first image P1.

Figure 9:
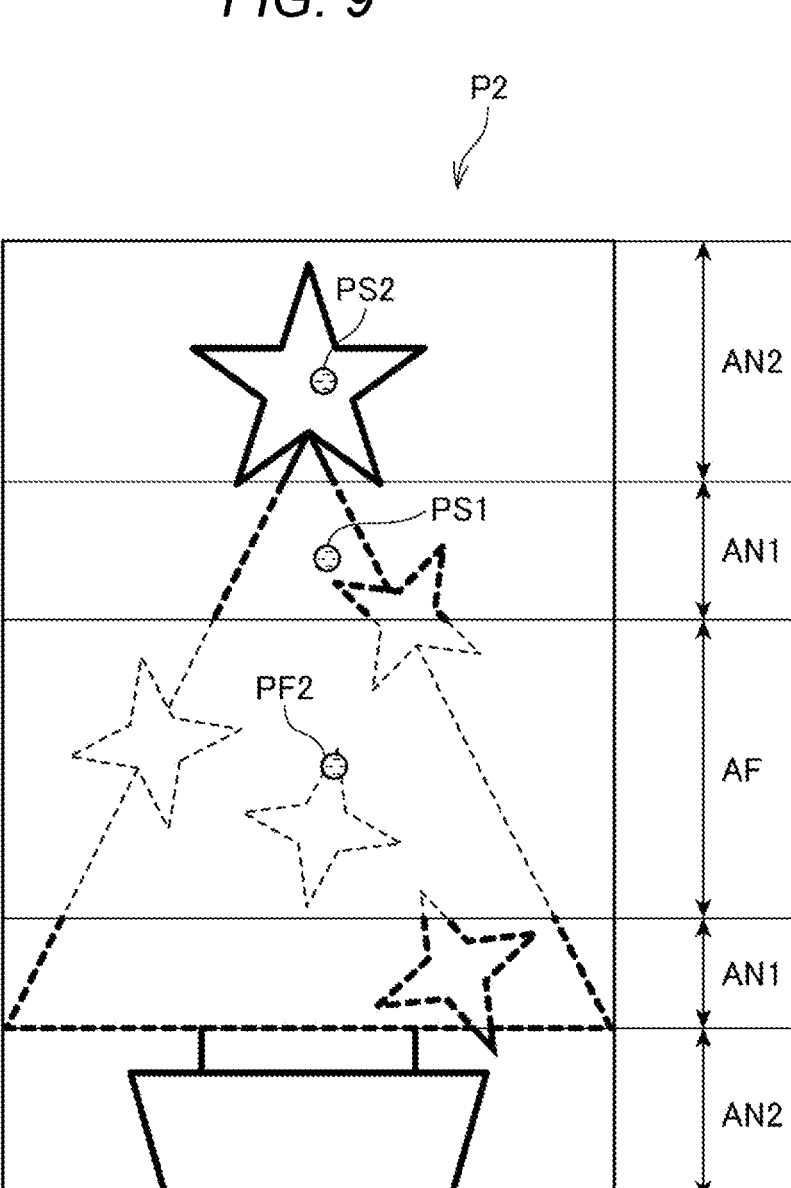
FIG. 9 is an image showing an example of a second image.

FIG. 9 is an image showing an example of the second image P2. The second image P2 is generated by the generator 215 performing blurring over a range including the second in-focus point PF2 in the first image P1.

Figure 6:
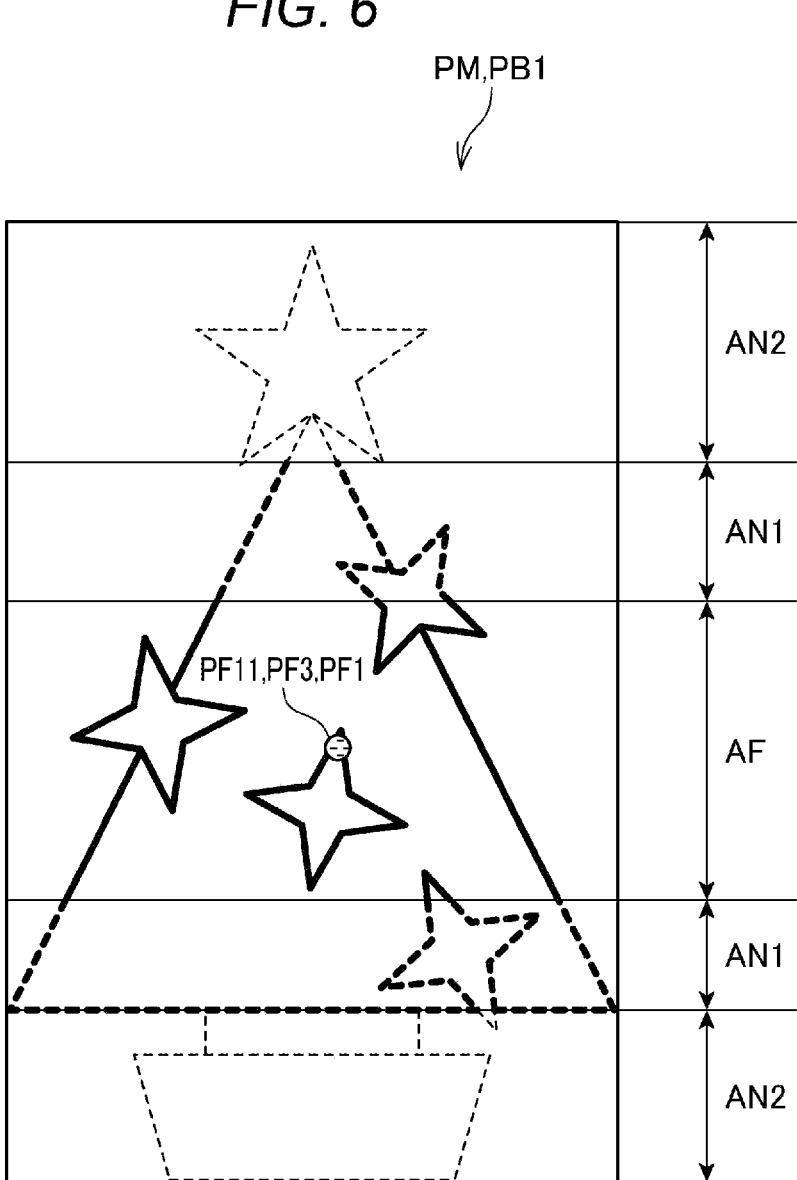
FIG. 6 is an image showing an example of a first projection image and a captured image.

As shown in FIG. 9, the in-focus area AF, the first non-in-focus area AN1, and the second non-in-focus area AN2 described with reference to FIG. 6 are set in the second image P2. The second in-focus point PF2 is included in the in-focus area AF. The first reference point PS1 is included in the first non-in-focus area AN1. The second reference point PS2 is included in the second non-in-focus area AN2.

The generator 215 determines, for example, the in-focus area AF, which is an area where the image is in focus, in the first projection image PB1, as the in-focus area AF in the first image P1. The generator 215 also determines, for example, the first non-in-focus area AN1, which is an area where the image is blurred, in the first projection image PB1, as the first non-in-focus area AN1 in the first image P1. The generator 215 also determines, for example, the second non-in-focus area AN2, which is an area where the image is more blurred than in the first non-in-focus area AN1, in the first projection image PB1, as the second non-in-focus area AN2 in the first image P1.

The generator 215 performs the strongest blurring (first level of blurring), for example, on the in-focus area AF in the first image P1. The generator 215 performs weaker blurring (second level of blurring) than the blurring performed on the in-focus area AF, for example, on the first non-in-focus area AN1 in the first image P1. The generator 215 does not perform any blurring, for example, on the second non-in-focus area AN2 in the first image P1.

That is, in this embodiment, performing the third level of blurring means not performing any blurring.

The second image P2 shown in FIG. 9 is thus generated.

As shown in FIG. 9, in the second non-in-focus area AN2, the second image P2 is generated by a clear solid line. In the first non-in-focus area AN1, the second image P2 is generated by a blurred solid line. In FIG. 9, the "blurred solid line" is shown as a bold dashed line. In the in-focus area AF, the second image P2 is generated by a more blurred solid line than in the first non-in-focus area AN1. In FIG. 9, the "more blurred solid line" is shown as a thin dashed line.

In this embodiment, a case where the generator 215 sets five areas in the second image P2 and changes the strength of blurring in stages is described. However, this is not limiting. It suffices that the generator 215 performs blurring over a range including the second in-focus point PF2 in the first image P1 and thus generates the second image P2.

The generator 215 may perform blurring, for example, on the in-focus area AF in the first image P1 and may not perform blurring on the first non-in-focus area AN1 and the second non-in-focus area AN2 in the first image P1. The generator 215 may also set six or more areas in the second image P2 and change the strength of blurring in stages.

The generator 215 may, for example, change the strength of blurring continuously.

Figure 10:
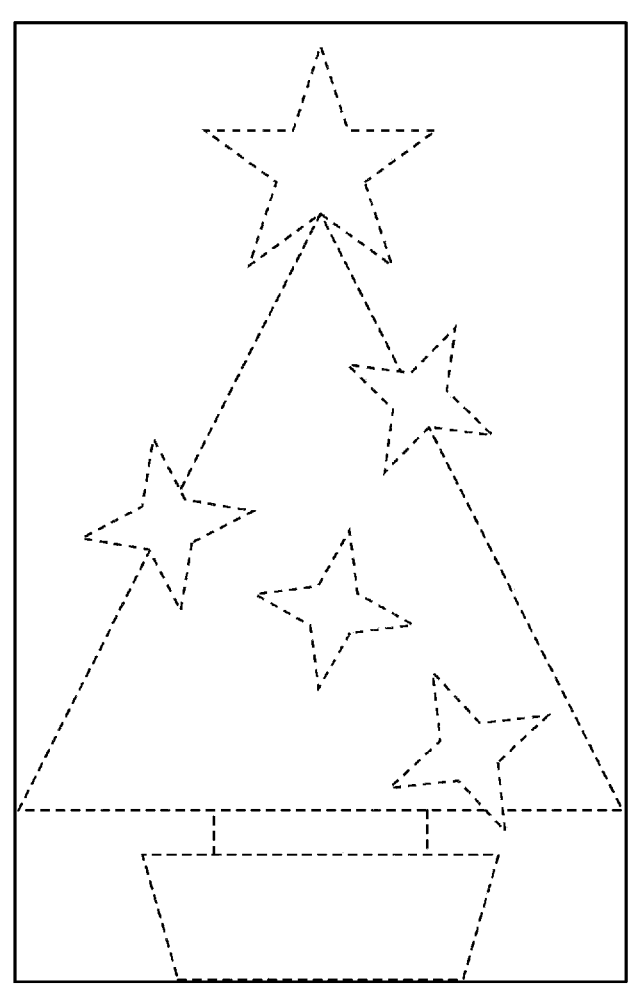
FIG. 10 is an image showing an example of a second projection image.

FIG. 10 is an image showing an example of the second projection image PB2. The second projection image PB2 is displayed on the wall surface WL by the second projection unit 216 causing the projector 100 to project the second image P2 onto the wall surface WL.

As shown in FIG. 10, the second projection image PB2 is indicated by a blurred solid line. In FIG. 10, the "blurred solid line" is shown as a thin dashed line.

Since the second projection image PB2 is indicated by a blurred solid line as shown in FIG. 10, the generation of a sense of incongruity due to the difference in the way the image looks between the area in focus and the area out of focus can be restrained.

7. Processing by Controller

Figure 11:
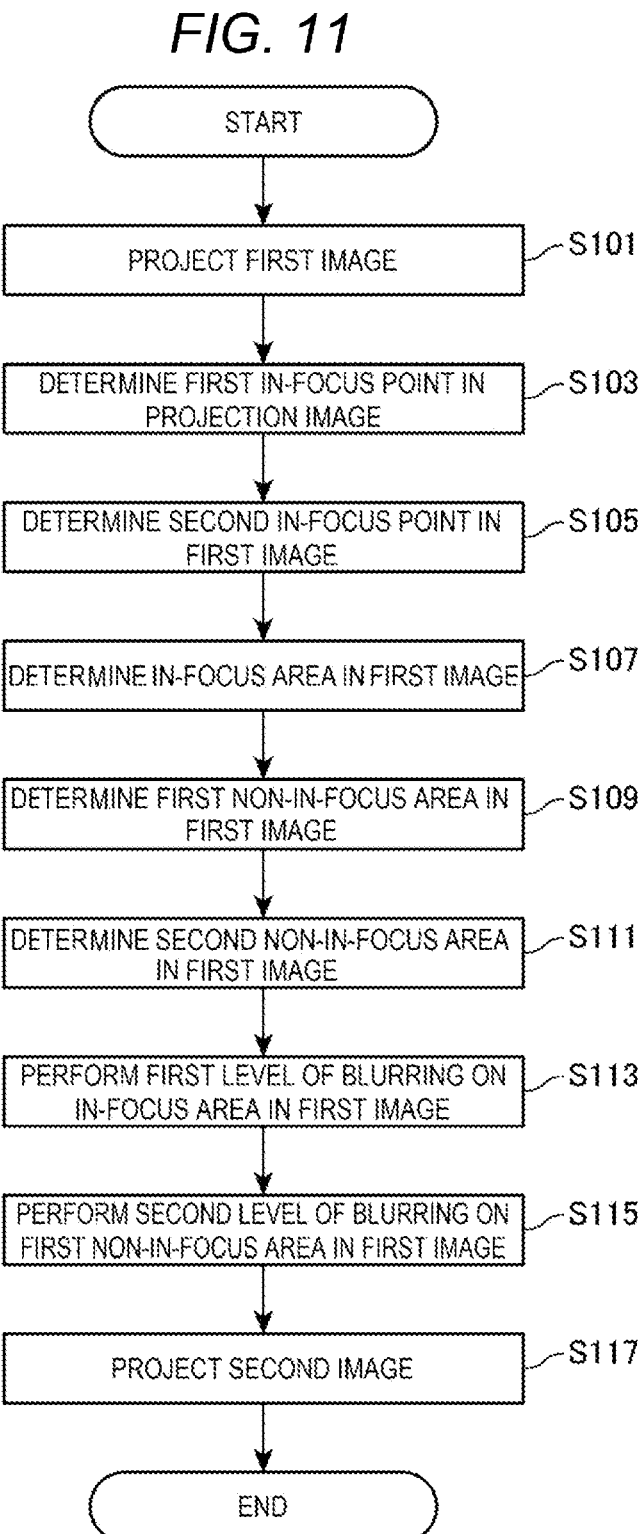
FIG. 11 is a flowchart showing an example of processing by a second controller.

An example of processing by the second controller 210 will now be described with reference to FIG. 11. FIG. 11 is a flowchart showing the processing by the second controller 210. FIG. 11 describes a case where the first determiner 213 determines the first in-focus point PF1, using the second method described with reference to FIGS. 4 and 7.

As shown in FIG. 11, in step S101, the first projection unit 212 projects the first image P1 as the first projection image PB1 onto the projection surface SC.

Next, in step S103, the first determiner 213 determines the first in-focus point PF1 indicating the in-focus position in the first projection image PB1 on the projection screen SC.

Next, in step S105, the second determiner 214 determines the second in-focus point PF2 corresponding to the first in-focus point PF1 in the first image P1.

Next, in step S107, the generator 215 determines the in-focus area AF, which is an area where the image is in focus, in the first projection image PB1, as the in-focus area AF in the first image P1.

Next, in step S109, the generator 215 determines the first non-in-focus area AN1, which is an area where the image is blurred, in the first projection image PB1, as the first non-in-focus area AN1 in the first image P1.

Next, in step S111, the generator 215 determines the second non-in-focus area AN2, which is an area where the image more blurred than in the first non-in-focus area AN1, in the first projection image PB1, as the second non-in-focus area AN2 in the first image P1.

Next, in step S113, the generator 215 performs the first level of blurring on the in-focus area AF in the first image P1. The first level of blurring refers to the strongest blurring. The first level of blurring is, for example, using a 10×10 averaging filter in averaging.

Next, in step S115, the generator 215 performs the second level of blurring on the first non-in-focus area AN1 in the first image P1. The second level of blurring refers to weaker blurring than the blurring performed on the in-focus area AF. The second level of blurring is, for example, performing averaging using a 5×5 averaging filter, which is smaller than the 10×10 averaging filter used in the first level of blurring. The generator 215 does not perform any blurring on the second non-in-focus area AN2 in the first image P1. By the processing of steps S113 and S115, the generator 215 generates the second image P2.

Next, in step S117, the second projection unit 216 projects the second image P2 as the second projection image PB2 onto the projection surface SC. After that, the processing ends.

Step S101 corresponds an example of "projecting a first image as a projection image onto a projection surface". Step S103 corresponds to an example of "determining a first in-focus point". Step S105 corresponds to an example of "determining a second in-focus point". Steps S107 to S115 correspond to an example of "generating a second image". Step S117 corresponds to an example of "projecting the second image as the projection image onto the projection surface".

8. Present Embodiment and Advantageous Effects

As described above with reference to FIGS. 1 to 7, the control method for the projector 100 according to this embodiment includes: projecting the first image P1 as the first projection image PB1 onto the wall surface WL; determining the first in-focus point PF1 indicating the in-focus position in the first projection image PB1 on the wall surface WL; determining the second in-focus point PF2 corresponding to the first in-focus point PF1, in the first image P1; performing the first level of blurring over a range including the second in-focus point PF2 in the first image P1, and thus generating the second image P2; and projecting the second image P2 as the second projection image PB2 onto the wall surface WL.

In this configuration, the first level of blurring is performed over the range including the second in-focus point PF2 in the first image P1, and the second image P2 is thus generated. The second image P2 is projected as the second projection image PB2 onto the wall surface WL.

Thus, the second projection image PB2 that is blurred can be projected onto the wall surface WL. Therefore, the generation of a sense of incongruity due to the difference in the way the image looks between the area in focus and the area out of focus in the projection image PB can be restrained.

In the control method for the projector 100 according to this embodiment, determining the first in-focus point PF1 includes receiving an operation of designating the first in-focus point PF1 from the user.

In this configuration, the position designated by the operation is determined as the first in-focus point PF1.

Therefore, an appropriate first in-focus point PF1 can be determined with a simple configuration.

In the control method for the projector 100 according to this embodiment, determining the first in-focus point PF1 includes: acquiring the distance LS between the projector 100 and the wall surface WL, the angle θ formed by the axis of projection PLA of the projector 100 and the wall surface WL, and the focal length FD of the projection lens 113A provided in the projector 100; and determining the first in-focus point PF1, based on the distance LS, the angle θ, and the focal length FD.

In this configuration, the first in-focus point PF1 is determined, based on the distance LS, the angle θ, and the focal length FD.

Therefore, an appropriate first in-focus point PF1 can be determined.

In the control method for the projector 100 according to this embodiment, determining the first in-focus point PF1 includes: projecting the pattern image PP as the projection image PB onto the wall surface WL; generating the captured image PM generated by capturing an image of the projection image PB on the wall surface WL; determining the third in-focus point PF3 indicating the in-focus position in the captured image PM; and determining the position in the projection image PB corresponding to the third in-focus point PF3, as the first in-focus point PF1.

In this configuration, the third in-focus point PF3 indicating the in-focus position in the captured image PM is determined, and the position in the projection image PB corresponding to the third in-focus point PF3 is determined as the first in-focus point PF1.

Therefore, an appropriate first in-focus point PF1 can be determined.

In the control method for the projector 100 according to this embodiment, the first image P1 includes the first reference point PS1 at the first distance L1 from the second in-focus point PF2, and generating the second image P2 includes performing the second level of blurring, which is weaker than the first level of blurring performed on the second in-focus point PF2, on the first reference point PS1.

In this configuration, the first image P1 includes the first reference point PS1 at the first distance L1 from the second in-focus point PF2, and in generating the second image P2, the second level of blurring, which is weaker than the first level of blurring performed on the second in-focus point PF2, is performed on the first reference point PS1.

Since the second level of blurring, which is weaker than the first level of blurring performed on the second in-focus point PF2, is performed on the first reference point PS1, the second projection image PB2 that is blurred can be projected onto the wall surface WL. Therefore, the generation of a sense of incongruity due to the difference in the way the image looks between the area in focus and the area out of focus in the projection image PB can be restrained.

In the control method for the projector 100 according to this embodiment, the first image P1 includes the second reference point PS2 at the second distance L2 longer than the first distance L1 from the second in-focus point PF2, and generating the second image P2 includes performing the third level of blurring, which is weaker than the second level of blurring, on the second reference point PS2.

In this configuration, the third level of blurring, which is weaker than the second level of blurring, is performed on the second reference point PS2.

Since the third level of blurring, which is weaker than the second level of blurring, is performed on the second reference point PS2, the second projection image PB2 that is blurred can be projected onto the wall surface WL. Therefore, the generation of a sense of incongruity due to the difference in the way the image looks between the area in focus and the area out of focus in the projection image PB can be restrained.

The second control program PG2 of the control device 200 according to this embodiment causes the second processor 210A to execute: projecting the first image P1 as the first projection image PB1 onto the wall surface WL; determining the first in-focus point PF1 indicating the in-focus position in the first projection image PB1 on the wall surface WL; determining the second in-focus point PF2 corresponding to the first in-focus point PF1, in the first image P1; performing blurring over a range including the second in-focus point PF2 in the first image P1, and thus generating the second image P2; and projecting the second image P2 as the second projection image PB2 onto the wall surface WL.

With this configuration, the second control program PG2 of the control device 200 according to this embodiment achieves effects similar to those of the control method for the projector 100 according to this embodiment.

The projector 100 according to this embodiment includes the projection unit 110 and the first processor 150A. The first processor 150A executes: projecting the first image P1 as the first projection image PB1 onto the wall surface WL, using the projection unit 110; determining the first in-focus point PF1 indicating the in-focus position in the first projection image PB1 on the wall surface WL; determining the second in-focus point PF2 corresponding to the first in-focus point PF1, in the first image P1; performing blurring over a range including the second in-focus point PF2 in the first image P1, and thus generating the second image P2; and projecting the second image P2 as the second projection image PB2 onto the wall surface WL, using the projection unit 110.

With this configuration, the projector 100 according to this embodiment achieves effects similar to those of the control method for the projector 100 according to this embodiment.

9. Other Embodiments

The foregoing embodiment is a preferred embodiment. However, the present disclosure is not limited to the foregoing embodiment and can be implemented with various modifications without departing from the spirit and scope of the present disclosure.

Each functional unit shown in FIGS. 3 and 4 represents a functional configuration and is not limited to any specific form of installation. That is, a piece of hardware corresponding individually to each functional unit need not necessarily be installed. Of course, a single processor may be configured to execute a program to implement functions of a plurality of functional units. Also, a part of the functions implemented by software in the embodiment may be implemented by hardware. Alternatively, a part of the functions implemented by hardware may be implemented by software. Moreover, the specific detailed configuration of each of the other parts of the projector 100 can be arbitrarily changed without departing from the spirit and scope of the present disclosure.

The processing steps in the flowchart shown in FIG. 11 are provided by dividing the processing according to the main content of the processing in order to facilitate the understanding of the processing by the second controller 210. The way the processing is divided into steps and the names of the steps shown in the flowchart of FIG. 11 are not limiting. The processing may be divided into more steps according to the content of the processing. Also, the processing may be divided in such a way that one step includes more processing. The order of the steps in the flowchart is not limited to the illustrated example, either.

The control method for the projector 100 can be implemented by causing the second processor 210A provided in the control device 200 to execute the second control program PG2 corresponding to the control method for the projector 100. The second control program PG2 can be recorded in a computer-readable recording medium. As the recording medium, a magnetic or optical recording medium or a semiconductor memory device can be used.

Specifically, a portable recording medium such as a flexible disk, an HDD, a CD-ROM (compact disk read-only memory), a DVD, Blu-ray (trademark registered) disc, a magneto-optical disk, a flash memory or a card-type recording medium, or a fixed recording medium can be employed. The recording medium may also be a non-volatile storage device such as a RAM, a ROM or an HDD that is an internal storage device provided in an image processing device.

The control method for the projector 100 can also be implemented by storing the second control program PG2 corresponding to the control method for the projector 100, in a server device or the like, and downloading the second control program PG2 from the server device to the control device 200.

The control method for the projector 100 can also be implemented by causing the first processor 150A provided in the projector 100 to execute the first control program PG1 corresponding to the control method for the projector 100. The first control program PG1 can be recorded in a computer-readable recording medium. As the recording medium, a magnetic or optical recording medium or a semiconductor memory device can be used.

Specifically, a portable recording medium such as a flexible disk, an HDD, a CD-ROM, a DVD, Blu-ray (trademark registered) disc, a magneto-optical disk, a flash memory or a card-type recording medium, or a fixed recording medium can be employed. The recording medium may also be a non-volatile storage device such as a RAM, a ROM or an HDD that is an internal storage device provided in an image processing device.

The control method for the projector 100 can also be implemented by storing the first control program PG1 corresponding to the control method for the projector 100, in a server device or the like, and downloading the first control program PG1 from the server device to the projector 100.

10. Summary of Present Disclosure

Supplementary notes as a summary of the present disclosure are given below.

Supplementary Note 1

A control method for a projector includes: projecting a first image as a projection image onto a projection surface; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface.

In this way, the first blurring is performed over the range including the second in-focus point in the first image, and the second image is thus generated. The second image is projected as the projection image onto the projection surface. Thus, a blurred projection image can be projected onto the projection surface. Therefore, the generation of a sense of incongruity due to the difference in the way the image looks between the area in focus and and the area out of focus in the projection image can be restrained.

Supplementary Note 2

In the control method for the projector described in Supplementary Note 1, determining the first in-focus point includes receiving an operation of designating the first in-focus point from a user.

In this way, the position designated by the operation from the user is determined as the first in-focus point. Therefore, an appropriate first in-focus point can be determined with a simple configuration.

Supplementary Note 3

In the control method for the projector described in Supplementary Note 1, determining the first in-focus point includes: acquiring a distance between the projector and the projection surface, an angle formed by an axis of projection of the projector and the projection surface, and a focal length of a projection lens provided in the projector; and determining the first in-focus point, based on the distance, the angle, and the focal length.

In this way, the first in-focus point is determined, based on the distance, the angle, and the focal length. Therefore, an appropriate first in-focus point can be determined.

Supplementary Note 4

In the control method for the projector described in Supplementary Note 1, determining the first in-focus point includes: projecting a pattern image as the projection image onto the projection surface; generating a captured image generated by capturing an image of the projection image on the projection surface; determining a third in-focus point indicating an in-focus position in the captured image; and determining a position in the projection image corresponding to the third in-focus point, as the first in-focus point.

In this way, the third in-focus point indicating the in-focus position in the captured image is determined, and the position in the projection image corresponding to the third in-focus point is determined as the first in-focus point. Therefore, an appropriate first in-focus point can be determined.

Supplementary Note 5

In the control method for the projector described in one of Supplementary Notes 1 to 4, the first image includes a first reference point at a first distance from the second in-focus point, and generating the second image includes performing second blurring which is weaker than the first blurring performed on the second in-focus point, on the first reference point.

Since the second blurring, which is weaker than the first blurring performed on the second in-focus point, is thus performed on the first reference point, a blurred projection image can be projected onto the projection surface. Therefore, the generation of a sense of incongruity due to the difference in the way the image looks between the area in focus and the area out of focus in the projection image can be restrained.

Supplementary Note 6

In the control method for the projector described in one of Supplementary Notes 1 to 5, the first image includes a second reference point at a second distance longer than the first distance from the second in-focus point, and generating the second image includes performing third blurring which is weaker than the second blurring, on the second reference point.

Since the third blurring, which is weaker than the second blurring, is performed on the second reference point, a blurred projection image can be projected onto the projection surface. Therefore, the generation of a sense of incongruity due to the difference in the way the image looks between the area in focus and the area out of focus in the projection image can be restrained.

Supplementary Note 7

A non-transitory computer-readable storage medium storing a program is provided. The program causes a computer to execute: projecting a first image as a projection image onto a projection surface; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface.

Thus, the program described in Supplementary Note 7 achieves effects similar to those of the control method for the projector described in Supplementary Note 1.

Supplementary Note 8

A projector includes an optical device and a processor. The processor executes: projecting a first image as a projection image onto a projection surface, using the optical device; determining a first in-focus point indicating an in-focus position in the projection image on the projection surface; determining a second in-focus point corresponding to the first in-focus point, in the first image; performing first blurring over a range including the second in-focus point in the first image, and thus generating a second image; and projecting the second image as the projection image onto the projection surface, using the optical device.

Thus, the projector described in Supplementary Note 8 achieves effects similar to those of the control method for the projector described in Supplementary Note 1.

What is claimed is:

1. A control method for a projector, the method comprising:

projecting a first image as a projection image onto a projection surface;

determining a first in-focus point indicating an in-focus position in the projection image on the projection surface;

determining a second in-focus point in the first image corresponding to the first in-focus point; and projecting a second image generated by performing first blurring over a range including the second in-focus point in the first image, as the projection image onto the projection surface.

2. The control method for the projector according to claim 1, wherein the determining the first in-focus point includes receiving an operation of designating the first in-focus point from a user.

3. The control method for the projector according to claim 1, wherein the determining the first in-focus point includes:

acquiring a distance between the projector and the projection surface, an angle formed by an axis of projection of the projector and the projection surface, and a focal length of a projection lens provided in the projector; and determining the first in-focus point, based on the distance, the angle, and the focal length.

4. The control method for the projector according to claim 1, wherein the determining the first in-focus point includes:

projecting a pattern image as the projection image onto the projection surface;

determining a third in-focus point indicating an in-focus position in a captured image generated by capturing an image of the projection image on the projection surface; and determining a position in the projection image corresponding to the third in-focus point, as the first in-focus point.

5. The control method for the projector according to claim 1, further comprising generating the second image by performing the first blurring, wherein the first image includes a first reference point at a first distance from the second in-focus point, and the generating the second image includes performing second blurring which is weaker than the first blurring, on the first reference point.

6. The control method for the projector according to claim 5, wherein the first image includes a second reference point at a second distance longer than the first distance from the second in-focus point, and the generating the second image includes performing third blurring which is weaker than the second blurring, on the second reference point.

7. A non-transitory computer-readable storage medium storing a program, the program causing a computer to execute:

projecting a first image as a projection image onto a projection surface;

determining a first in-focus point indicating an in-focus position in the projection image on the projection surface;

determining a second in-focus point in the first image corresponding to the first in-focus point; and projecting a second image generated by performing first blurring over a range including the second in-focus point in the first image, as the projection image onto the projection surface.

8. A projector comprising:

an optical device; and a processor programmed to execute:

projecting a first image as a projection image onto a projection surface, using the optical device;

determining a first in-focus point indicating an in-focus position in the projection image on the projection surface;

determining a second in-focus point in the first image corresponding to the first in-focus point; and projecting a second image generated by performing first blurring over a range including the second in-focus point in the first image, as the projection image onto the projection surface, using the optical device.

* * * * *